United States Patent [19]

Fallon et al.

[11] Patent Number: 4,666,109

[45] Date of Patent: May 19, 1987

[54] TUBE SUPPORT ASSEMBLY

[75] Inventors: Timothy R. Fallon, Spartanburg, S.C.; Jerry W. Smith, North Miami Beach, Fla.

[73] Assignee: Draft Systems, Inc., Spartanburg, S.C.

[21] Appl. No.: 779,998

[22] Filed: Sep. 25, 1985

Related U.S. Application Data

[63] Continuation-in-part of Ser. No. 694,820, Jan. 25, 1985, abandoned.

[51] Int. Cl.$^4$ .............................................. F16L 3/20
[52] U.S. Cl. .................................... 248/50; 248/74.2; 248/60
[58] Field of Search ................. 248/50, 74.2, 73, 613, 248/60; 174/133 H

[56] References Cited

U.S. PATENT DOCUMENTS

| | | | |
|---|---|---|---|
| 1,013,187 | 1/1912 | Lofton et al. | 248/60 |
| 1,477,549 | 12/1923 | Eckert | 248/60 |
| 1,704,472 | 3/1929 | Grandjean | 248/50 |
| 1,822,980 | 9/1931 | Palmer | 248/50 |
| 2,545,416 | 3/1951 | Staaf | 248/50 |
| 2,629,814 | 2/1953 | Brown | 240/50 |
| 2,744,705 | 5/1956 | Richter | 248/50 |
| 2,850,560 | 9/1958 | Heyob et al. | 174/138 H |
| 2,885,538 | 5/1959 | Mahon et al. | 248/50 |
| 3,135,488 | 6/1964 | Leonard | 248/50 |
| 3,778,537 | 12/1973 | Miller | 248/72 |
| 4,201,004 | 5/1980 | Witt | 40/545 |

Primary Examiner—Ramon S. Britts
Assistant Examiner—Karen J. Chotkowski
Attorney, Agent, or Firm—Luke J. Wilburn, Jr.

[57] ABSTRACT

An assembly for adjustably supporting a luminous tube of a neon sign comprising a clamp post having a C-shaped end portion for frictionally engaging and retaining an outer surface of a luminous tube therein, a tubular column telescopically receiving the clamp post into one end thereof for movement along the longitudinal axis of the column, a ball-shaped portion on the other end of the column engageable in a semi-spherical socket of a base for positional adjustment of the column and clamp post within a 360° circle of movement, and means on the base for frictionally gripping a support member to provide positional adjustable support of a luminous tube in spaced relation therefrom. The clamp post, tubular column, and base are preferably formed of molded plastic and engage in snap-fit relation. Spring means are provided in the tubular column to bias the clamp post against movement along the longitudinal axis of the column.

7 Claims, 6 Drawing Figures

TUBE SUPPORT ASSEMBLY

This application is a continuation-in-part of U.S. patent application Ser. No. 694,820 filed Jan. 25, 1985 now abandoned.

This invention relates to a new and improved support assembly for adjustably positionally supporting a tube in spaced relation from a supporting surface, and, more particularly, to a tube support assembly adapted for adjustably mounting lighting tubes of the kind commonly employed in neon signs to position the tubes in a desired spaced relation from other elements of the signs.

BACKGROUND OF THE INVENTION

Illuminated tubular lighting of the neon tube type is well known and has been employed for many years in advertising display signs and other decorative lighting. Typically, such neon signs are constructed of a support frame on which may be mounted a back display panel and variously contoured or configured neon illuminating glass tubing. The glass tubing is generally supported in spaced relation from the support frame and back panel by a plurality of short, stand-off elements attached to and extend outwardly from the sign frame at spaced locations along its length. Generally, the tubing is secured to the support elements by a wire tie, or certain of the elements are constructed with a C-shaped clamp portion which engages and retains the tubing. Generally, the stand-off supports are attached to the sign support frame or the back panel by welding, rivots, or threaded fastening elements, such as screws or bolts, received in suitable openings in the back panel or frame.

It has also been known to provide spring members in the tube supports between the support frame and the tube itself to provide a force-dampening effect to protect against tube breakage in shipping and handling of the signs, and to provide a degree of lengthwise adjustment of the support elements to accomodate for uneveness in tubing and/or support frame dimensions and separation distances.

Since the luminous tubing of neon display signs is variously shaped, curved, and bent to provide desired lettering or other special artistic configurations in the sign, it is desirable to provide a degree of adjustability of the tube support elements to position them in the proper location and spacing on the sign frame to correctly support the tubing thereon. A number of luminous tube support constructions for mounting tubing on supporting surfaces are disclosed in the following U.S. Pat. Nos.: 1,822,980 Palmer, 2,545,416 Staaf, 2,629,814 Brown, 2,885,538 Mahon et al., 3,135,488 Leonard, 4,201,004 Witt.

BRIEF OBJECTS OF THE PRESENT INVENTION

It is an object of the present invention to provide a new and improved tube support assembly for adjustably positioning and supporting a tube in spaced relation from a supporting surface.

It is another object to provide an adjustable tube support assembly which may be readily attached to a supporting surface and to tubing to be supported, without the necessity of additional fastening elements or special adaptation of the supporting surface to receive the assembly.

It is a further object to provide a tube support assembly having improved positional adjustability from a supporting surface to receive and support a tube at various positions therefrom.

It is a more specific object to provide an improved support assembly for adjustably positionally supporting glass tubing of a neon sign from the support frame thereof, wherein the support assembly receives the tubing and the support frame of the sign in frictional snap-fit relation therewith.

It is still a further object to provide an improved support assembly for tubing which is of economical construction and composed principally of molded plastic parts which may be easily and quickly assembled in snap-fit relation with each other to provide for positional adjustability of the same in use.

It is another object to provide a support assembly for adjustably positionally supporting a glass tube of a neon sign while permitting movement of the tube in multiple directions to reduce breakage of the tube which may be caused by shock forces applied to the sign in handling, shipping or use.

BRIEF DESCRIPTION OF THE DRAWINGS

The above as well as other objects of the present invention will become more apparent, and the invention will be better understood from the following detailed description of preferred embodiments thereof, when taken together with the accompanying drawings in which.

DETAILED DESCRIPTION OF PREFERRED EMBODIMENTS

Figure 1:
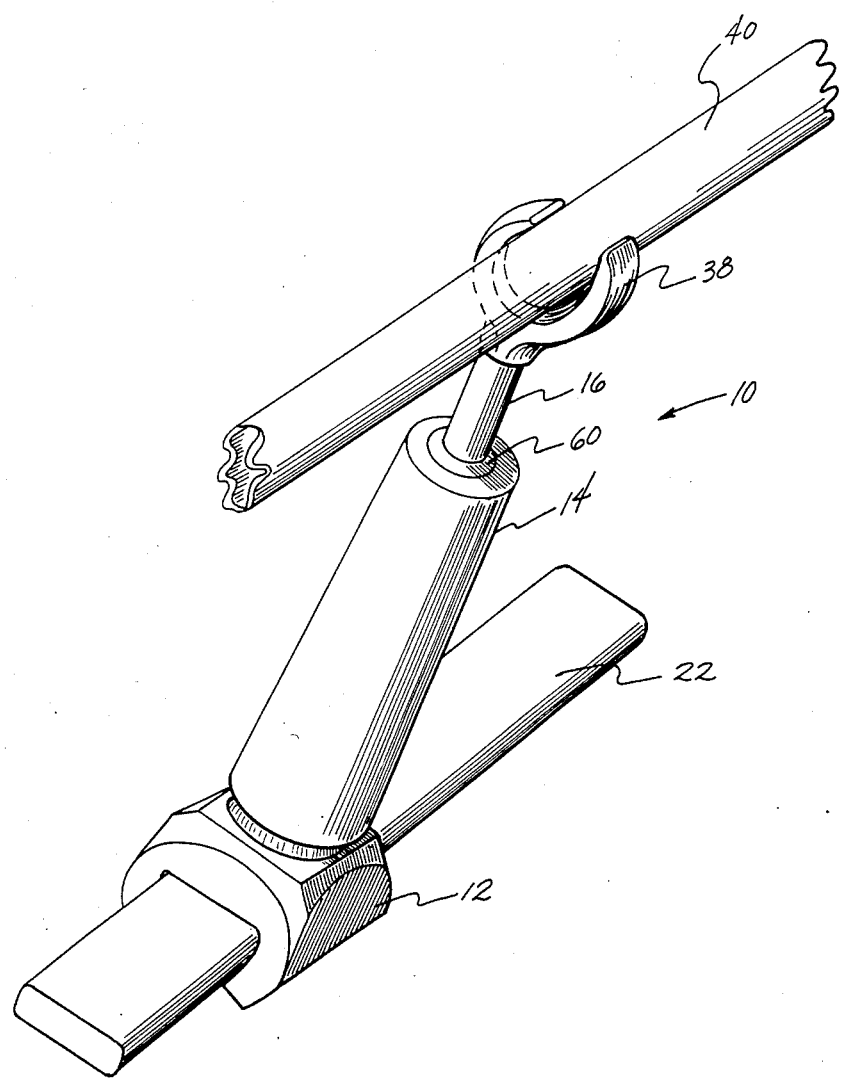
FIG. 1 is a schematic perspective view of a tube support assembly of the present invention supportably attached to a rod-shaped element support of the frame of a neon sign, with a portion of glass tubing supported C-clamp in the assembly.

Referring more particularly to the drawings, the adjustable tube support assembly 10 of the present invention generally comprises a base 12, a tubular column 14 pivotally mounted on the base, and a clamp post 16 telescopically received in the tubular column. The base, tubular column and clamp post are preferably molded of suitable high strength plastic, such as polystyrene.

As seen in the figures, the base 12 of the assembly has an overall generally rectangular shape. On the bottom side of the base, as seen, are a pair of spaced, inwardly tapering wall sections 18 defining an open-ended elongate channel 20 for grippingly engaging a typical generally rectangular rod-shaped element 22 of a supporting frame of a neon display sign (not shown). A continuous wall portion 26 on the top side of base 12 forms a generally semi-spherical socket 28 which communicates with the channel 20 to form an opening through the base from side to side.

Figures 2, 3:
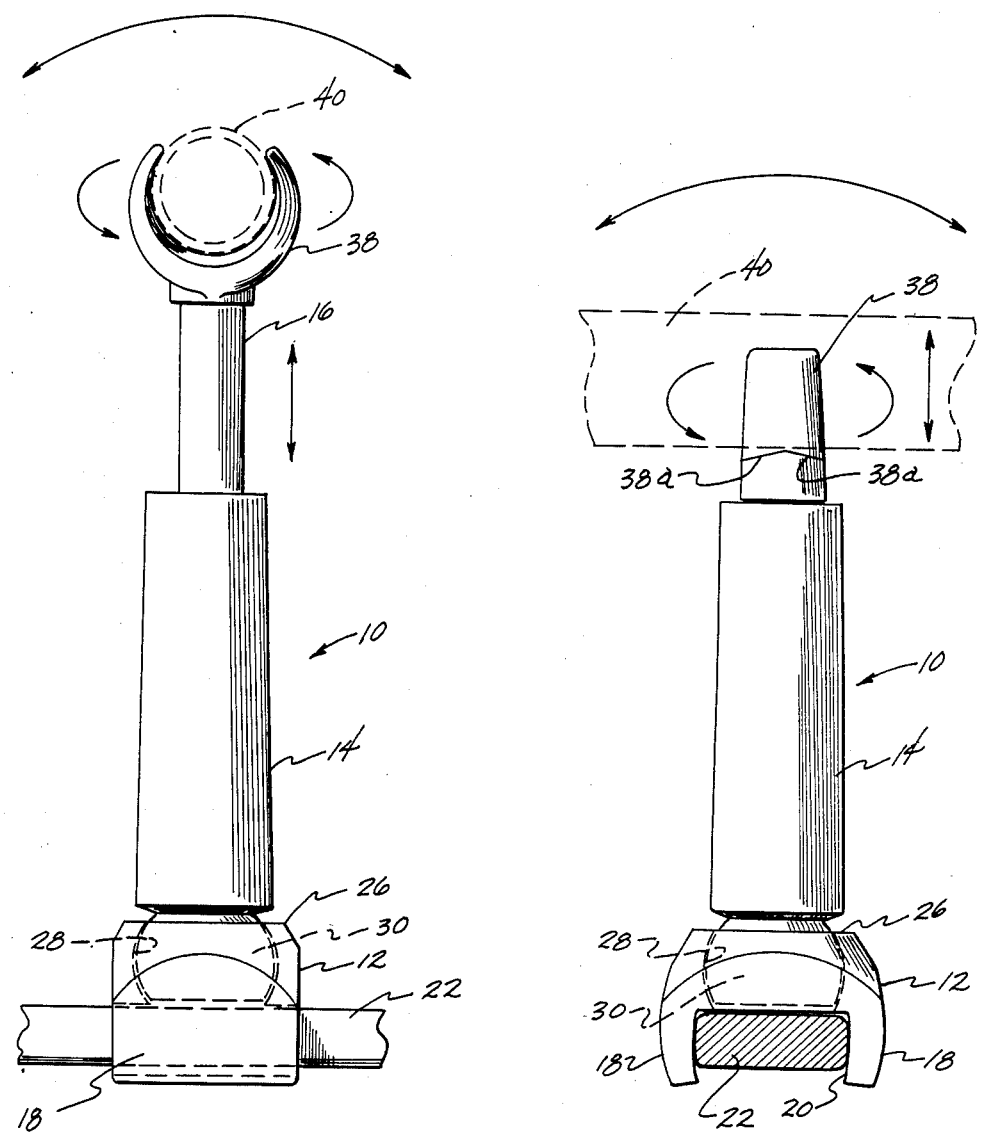
FIG. 2 is a end view of the assembly of FIG. 1.
FIG. 3 is a side view of the assembly of FIG. 1, with the clamp post of the assembly compressed into the support column.
Figure 4:
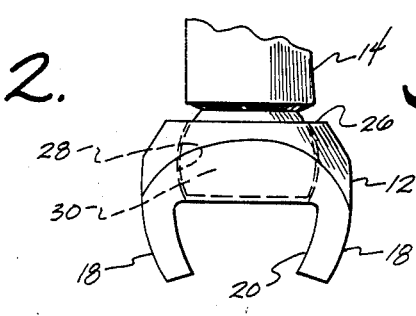
FIG. 4 is a fragmentary side view of the base of the assembly of FIG. 1, showing the shape of the side wall of the channel of the base when removed from the frame support element of the sign.

As illustrated in FIGS. 3 and 4, the inwardly tapering wall portions 18 are resiliently deformable to receive the rod-shaped element 22 of the neon sign frame in channel 20 in snap-fit relation therewith. Correspondingly, outer edges of the wall portion 26 forming the semi-spherical socket 28 are resiliently deformable to receive a ball-shaped base portion 30 of tubular column 14 in snap-fit relation therewith.

Figure 5:
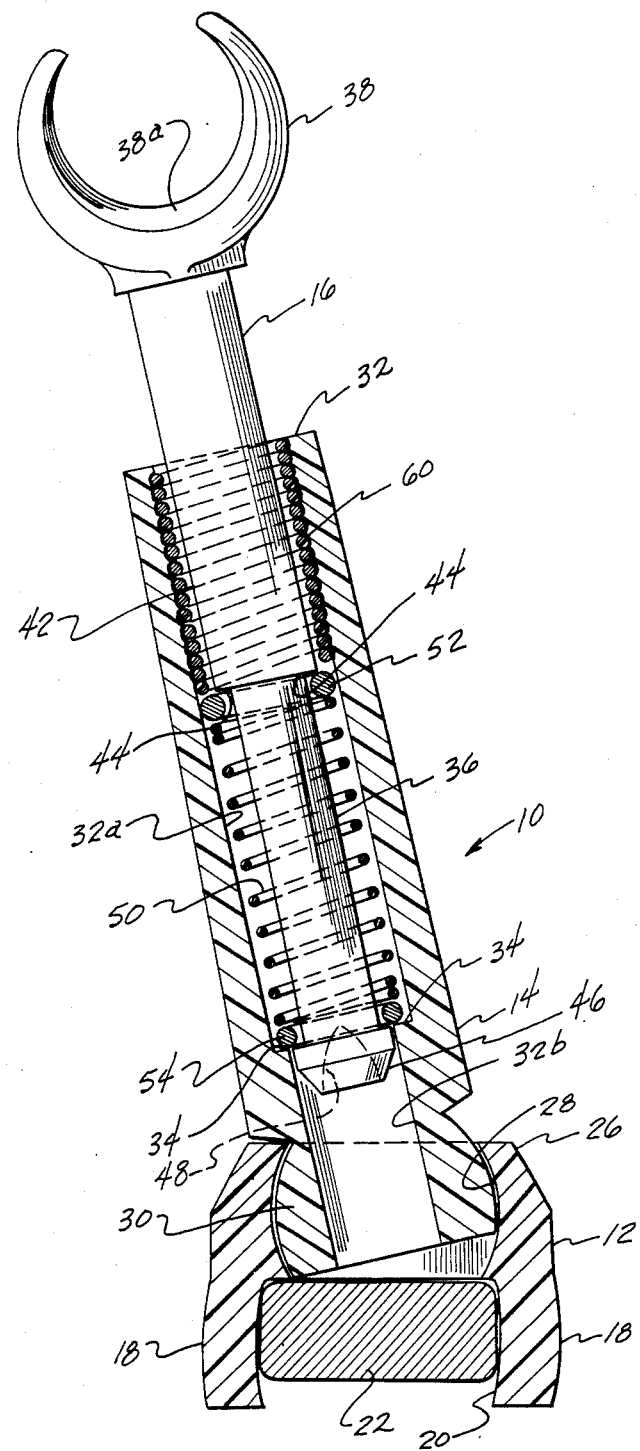
FIG. 5 is an enlarged end view of the assembly of FIG. 1, with portions in vertical section to show the interior of the assembly.

As seen in FIG. 5, tubular column 14 has an open, upper end 32 and a passageway extending therethrough to a lower opening in the bottom of the ball-shaped portion 30 of the column. The upper portion 32a of the column passageway is of uniform diameter, while the lower portion 32b is of a reduced diameter forming with the upper diameter portion a shoulder 34 in the passageway.

Telescopically received within the upper end of column 14 for movement in the passageway along the longitudinal axis of the column (note FIGS. 2 and 3) is an elongate lower portion 36 (FIG. 5) of the clamp post 16. The upper end of the clamp post is formed as a resiliently deformable generally C-shaped clamp 38 for receiving and frictionally retaining a glass illuminating tube 40 therein. The internal lower surface of the clamp 38 has a transversally bevelled surface 38a (FIGS. 3 and 5) to accomodate and support a glass tube at angles other than normal to the longitudinal axis of the clamp post, when required.

As seen in FIG. 5, the lower portion 36 of the clamp post is of reduced diameter from that of an upper portion 42 of the post to form a radial shoulder 44. The lower portion 36 of the post terminates in an enlarged diameter end portion 46. The enlarged end 46 of the post has a conically-shaped recess 48 to facilitate its resilient deformation, for purposes to be explained.

As also seen in FIG. 5, support assembly 10 further includes a metal spring 50 which resides in the column passageway in surrounding relation to the lower portion 36 of clamp post 16. Spring 50 is retained in position in the column passageway by means of two larger diameter metal rings 52, 54 which are frictionally received over the resilient, enlarged diameter end 46 of the clamp post in engagement with the upper and lower ends of the spring. Upper ring 52 engages and is retained by the post shoulder 44, while the lower ring 54 engages and is retained by the upper edge surface of the enlarged diameter end 46 of the post and the column passageway shoulder 34. The rings 52, 54 thus retain the ends of the spring on reduced diameter portion 36 of the post as the clamp post is moved against the force of the spring up or down along the axis of the column passageway.

The spring 50, rings 52, 54, and lower portion 36 of clamp post 16 are retained against removal from the tubular column passageway by a metal wire coil insert 60 which is of slightly larger outside diameter than the internal diameter of the upper portion of the column passageway and is press-fit to be frictionally secured therein.

The parts of the tube support assembly 10 may be readily assembled and interconnected for use, as follows:

Retaining coil 60, upper ring 52, spring 50, and lower ring 54 are received, in the order listed, over the enlarged end 46 and onto the lower portion 36 of clamp post 16. The end of the clamp post containing the assembled components is then inserted into the upper end of the tubular column passageway. The retaining coil insert 60 is press-fit into the upper end of the column 12 by suitable force-applying means to secure the rings 52, 54, spring 50 and clamp post 16 in the column passageway. The lower ball-shaped portion 30 of column 14 is then snap-fit into the semi-spherical socket 28 of base 12. The resilient walls 18 forming the base channel 20 can then be snap-fit about a rod-shaped support element of the support frame of a neon sign.

Tubular column 14 containing the clamp post 16 with its C-shaped clamp 38 may be pivoted in the base socket 28 within a 360° circle of movement to be located for receipt and support of a glass tubing. The support assembly 10 may be easily attached to rod support elements of a sign frame in any position, as desired, to supportably engage glass tubing, and without the necessity of additional fastening means, holes, recesses, or openings in the frame support elements to attach the assembly thereto.

In operation, the C-clamp 38 can move in either direction along the longitudinal axis of the tubular column against the tension and compression forces of the spring to accomodate and grippingly support glass tubing. As seen, engagement of lower ring 54 with the column shoulder 34 prevents movement of the lower end of the spring downwardly in the column when the post 16 moves downwardly. Engagement of the upper ring 52 with clamp post shoulder 44 and retaining coil 60 prevents movement of the upper end of the spring upwardly in the column as the post 16 moves upwardly, thus providing a biasing force against movement of the C-clamp in either direction along the longitudinal axis of the column. Such an arrangement permits lengthwise adjustment of the support assembly to accomodate a desired position of the glass tubing, while also serving to reduce breakage of the glass tubing by dampening and absorbing the shock effect of any forces applied against the neon sign frame.

Figure 6:
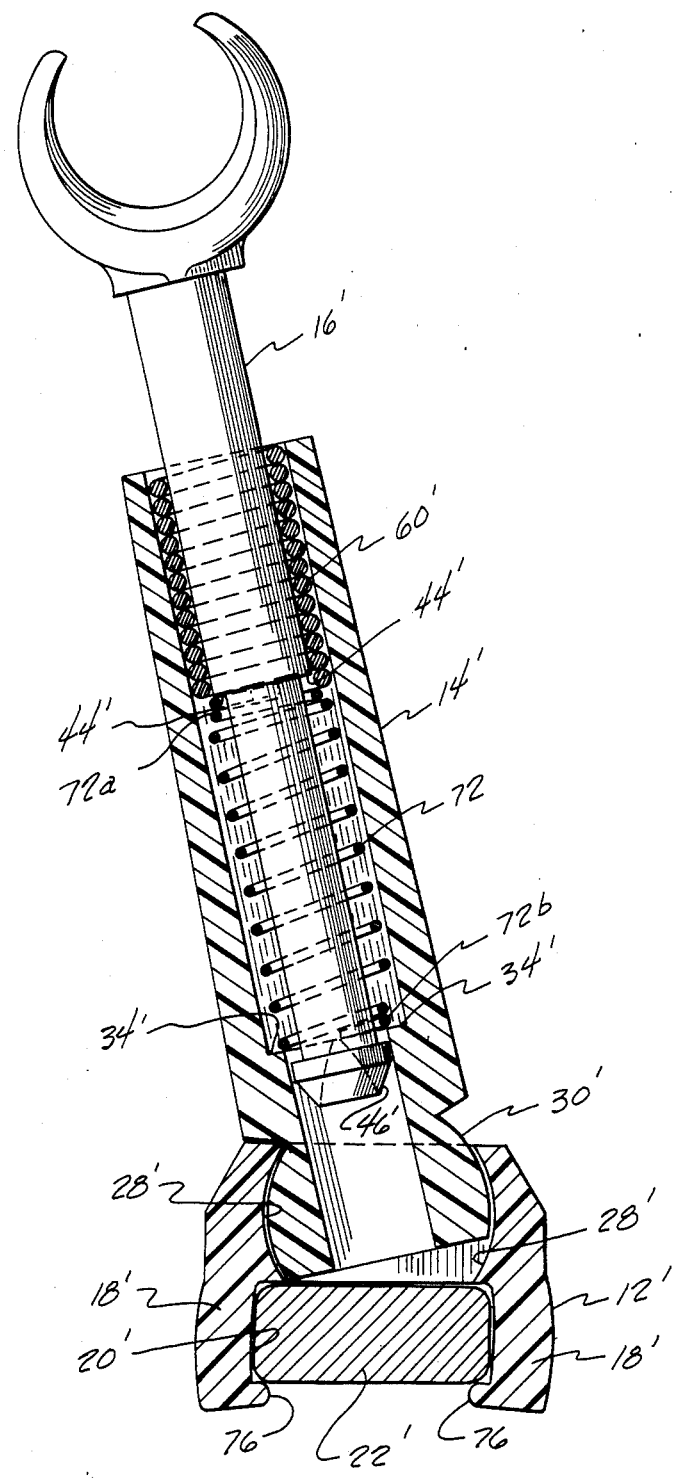
FIG. 6 is an enlarged end view of another embodiment of the assembly of FIGS. 1-5, with portions in vertical section to show the interior of the assembly.

FIG. 6 shows a further embodiment of the assembly of FIG. 1. Like parts of the support assembly of FIG. 6 to those shown in FIGS. 1-5 are indicated by prime numerals. Except as indicated hereinafter, the constructions are substantially identical.

The assembly of FIG. 6 includes C-shaped clamp post 16' receivable within tubular column 14', the ball-shaped lower portion 30' of which resides within the semi-spherical socket 28' of the base 12'. Located within the tubular column passageway in surrounding relation to clamp post 16' is metal wire coil insert 60' which frictionally engages the inner wall portion of the tubular column 14' to be retained therein. The column passageway includes radially inwardly extending shoulder 34'. In the embodiment of FIG. 6, the metal retaining rings 52, 54 shown in the embodiment of FIGS. 1-5 are omitted, and coil portions 72a, 72b at each end of spring 72 surrounding clamp post 16' are of slightly reduced diameter. As seen, coil portion 72a thus is dimensioned to engage with the retaining coil insert 60' and clamp post shoulder 44', while coil portion 72b is dimensioned to engage with column passageway shoulder 34' and the enlarged end portion 46' of post 16' during portions of movement of the post to retain the spring on the clamp post. The reduced diameter end portions of the spring 72 thus function as do the metal rings 50, 54 of the assembly of FIGS. 1-5 to restrain movement of respective ends of spring 72 during inward and outward movement of the C-clamp post in the tubular column and to resist removal of the clamp post 16' from the column. During assembly, the retaining coil 60' is received on the clamp post 16', the spring 72 is forced over the enlarged end 46' of the post to surround the post, and the post containing coil and spring thereon is frictionally press fitted into the passageway of the column with the coil frictionally engaging the upper inner wall surface of the passageway to retain the clamp post in the column.

The base 12' of the assembly of FIG. 6 is constructed like the base 12 of FIGS. 1-5, except that the lower inner edge of each inwardly tapering wall section 18' of base 12' defining the channel 20' is provided with a short inwardly projecting protrusion, or rib, 76 for increased frictional engagement and grip of lower edge portions of a rectangular rod-shaped element 22' of the supporting frame of a neon display sign.

In operation, the embodiment of the assembly shown in FIG. 6 functions in similar manner to the embodiment of FIGS. 1-5. The C-shaped clamp 38' can move in either direction along the longitudinal axis of the tubular column against the compression force of spring 72 to accommodate and grippingly support glass tubing. Engagement of the reduced diameter lower coil portion 72b of spring 72 with the column passageway shoulder 34' prevents movement of the lower end of the spring downwardly in the column when post 16' moves downwardly, while engagement of the reduced diameter upper coil portion 72a of spring 72 with retaining coil 60' prevents movement of the upper end of the spring upwardly in the column as post 16' moves upwardly. The spring thus provides a biasing force against movement of the C-clamp in either direction along the longitudinal axis of the column.

That which is claimed is:

1. An assembly for supporting a luminous tube comprising a clamp post having a C-shaped end portion for frictionally engaging and retaining an outer surface of a tube therein, a tubular column telescopically receiving the clamp post into one end thereof for movement along the longitudinal axis of the column, a ball-shaped portion on the other end of the column, a base having a generally semispherical socket for receivably retaining the ball-shaped portion of the column therein for pivotal adjustment of the column and clamp post to any position within a 360° circle of movement, and means on said base for frictionally gripping a support member to provide positionally adjustable support of a luminous tube in spaced relation therefrom; said clamp post, tubular column, and base being composed of plastic, and means received within said tubular column in surrounding relation to said clamp post for biasing the post against its movement along said axis of the tubular column and for retaining said post in said tubular column against outward removal therefrom; said means received within said tubular column in surrounding relation to said clamp post for retaining said post includes means frictionally engaged with the inner end portion of the tubular column for restricting the internal diameter thereof; and said means received within said tubular column in surrounding relation to said clamp post for biasing and retaining the post further includes a spring surronding said clamp post, and ring means disposed in said tubular column on said clamp post in engagement with the ends of the spring to prevent movement of one end of the spring relative to the column when the post is moved along the axis of the column in one direction and to prevent movement of the other end of the spring relative to the column when the post is moved along said axis in the opposite direction.

2. An assembly as defined in claim 1 wherein said means received within said tubular column in surrounding relation to said clamp post for retaining said post comprises a wire coil frictionally received within and retained by the inner surface of the end portion of the tubular column in surrounding relation to the clamp post, said wire coil having a portion in abutting engagement with said ring means to prevent passage of said ring means through the opening of the wire coil.

3. An assembly for supporting a tube in spaced relation from a tube-supporting surface comprising a C-shaped clamp for frictionally engaging and retaining an outer surface of a tube therein, an elongate column having a ball-shaped end portion and an opposite end portion supportably receiving the clamp for movement along the longitudinal axis of the column, a base having socket means for receivably retaining the ball-shaped portion of the column therein to permit pivotal adjustment of the column and C-shaped clamp to any position within a 360° circle of movement, and means on the base for frictionally gripping a tube supporting surface to provide support of a tube in spaced relation therefrom; said column being a tubular column having a passageway therethrough, the C-shaped clamp having an elongate post telescopically received within the tubular column for movement along the longitudinal axis of the column, spring means in said tubular column surrounding said post for biasing said clamp post against movement along the axis of the tubular column, and means retaining said spring means and post of the clamp in said tubular column against outward displacement therefrom comprising an insert restricting the interior diameter of the tubular column, and ring means engaging each end of the spring means on said post of the clamp, said ring means having a larger external diameter than the internal diameter of said insert.

4. An assembly as defined in claim 3 wherein said clamp, tubular column, and base are formed of plastic and have resiliently deformable portions for operative inter-engagement, and for engagement with a tube and a tube supporting surface.

5. An assembly as defined in claim 4 wherein said clamp post has an enlarged diameter end and a radial shoulder spaced therefrom, said spring means being positioned therebetween, an inwardly extending shoulder in said column passageway, and said ring means including a ring carried on said post at each end of said spring means, one of said rings being in engagement with the adjacent enlarged diameter end of the post and the other ring being in engagement with the shoulder of the post to contain the spring means thereon, the ring which engages the post shoulder also being engageable with the insert to prevent movement of the spring means and clamp post out of the tubular column, and the ring which engages the enlarged diameter end of the post being engageable with the column passageway shoulder to prevent movement of the ring therepast.

6. An assembly for supporting a luminous tube comprising a clamp post having a C-shaped end portion for frictionally engaging and retaining an outer surface of a tube therein, a tubular column having a passageway through and telescopically receiving the clamp post into one end thereof for movement along the longitudinal axis of the column, a ball-shaped portion on the other end of the column, a base having a generally semispherical socket for receivably retaining the ball-shaped portion of the column therein for pivotal adjustment of the column and clamp post to any position within a 360° circle of movement, and means on said base for frictionally gripping a support member to provide positionally adjustable support of a luminous tube in spaced relation therefrom; said clamp post, tubular column, and base being composed of plastic, and means received within said tubular column in surrounding relation to said clamp post for biasing the post against its movement along said axis of the tubular column and for retaining said post in said tubular column against outward removal therefrom; said post biasing and retaining means comprising a spring positioned in surrounding relation with a lower portion of the clamp post, an insert frictionally received within the tubular column passageway and retained by an inner surface at the upper end of the tubular column in surrounding relation to the clamp post, an outwardly extending shoulder on the clamp post, an inwardly extending shoulder in the tubular column passageway, an enlarged lower end portion on the clamp post, and said spring having an upper coil end portion in engagement with the insert and the clamp post shoulder and a lower coil end portion in engagement with the tubular column shoulder and the enlarged lower end portion of the clamp post at times during movement of the clamp post in the tubular column to provide a biasing force against movement of the clamp post in either direction along the longitudinal axis of the column.

7. An assembly for supporting a tube in spaced relation from a tube-supporting surface comprising a C-shaped clamp for frictionally engaging and retaining an outer surface of a tube therein, an elongate column having a ball-shaped end portion and an opposite end portion supportably receiving the clamp for movement along the longitudinal axis of the column, a base having socket means for receivably retaining the ball-shaped portion of the column therein to permit pivotal adjustment of the column and C-shaped clamp to any position within a 360° circle of movement, and means on the base for frictionally gripping a tube supporting surface to provide support of a tube in spaced relation therefrom; said column being a tubular column, the C-shaped clamp having an elongate post telescopically received within the tubular column for movement along the longitudinal axis of the column, spring means in said tubular column surrounding said post for biasing said clamp post against movement along the axis of the tubular column, and means retaining said spring means and post of the clamp in said tubular column against outward displacement therefrom; said means for retaining the spring means and clamp end portion in the tubular column comprising an insert restricting the interior diameter of the tubular column, and ring means engaging each end of the spring means on said post of the clamp, said ring means having a larger external diameter than the internal diameter of said insert; said clamp, tubular column, and base being formed of plastic and having resiliently deformable portions for operative inter-engagement, and for engagement with a tube and a tube supporting surface; and said base comprising downwardly extending resiliently deformable wall sections defining a channel for receiving and frictionally gripping an elongate support member for the assembly, the lower end portion of each of said wall sections having an inwardly extending rib for facilitating gripping engagement of the assembly support member.

* * * * *